United States Patent [19]
Tsai

[11] Patent Number: 6,063,329
[45] Date of Patent: May 16, 2000

[54] MINI WELDING/SOLDERING TORCH

[76] Inventor: Chin-Lin Tsai, 3F, No. 94, Sec. 4, Chung Hsin Road San Chung City, Taipei Hsien, Taiwan

[21] Appl. No.: 09/286,936

[22] Filed: Apr. 7, 1999

[51] Int. Cl.[7] .................................................. B23K 7/00
[52] U.S. Cl. ............................. 266/48; 431/344; 431/346
[58] Field of Search ................................... 431/255, 344, 431/345, 346; 266/48, 51

[56] References Cited

U.S. PATENT DOCUMENTS

| | | | |
|---|---|---|---|
| 3,182,334 | 5/1965 | Hammon | 431/346 |
| 3,243,272 | 3/1966 | Schmitz | 431/346 |
| 4,804,324 | 2/1989 | Yoshinaga | 431/255 |
| 5,725,369 | 3/1998 | Tsai | 431/344 |
| 5,816,794 | 10/1998 | Tsai | 431/344 |

*Primary Examiner*—Scott Kastler
*Attorney, Agent, or Firm*—Dougherty & Troxell

[57] ABSTRACT

A mini welding/soldering torch, which includes a gas burner, an oxygen control unit controlled to regulate the flow rate of oxygen from an oxygen storage means to the gas burner, and a fuel gas control unit controlled to regulate the flow rate of fuel gas from a fuel gas storage means to the gas burner for mixing with oxygen for burning, wherein a porous stone is mounted inside the gas burner to stop backward flame, and a rubber ring is mounted on a flow guide around a fuel gas outlet which is melted to seal the fuel gas outlet if flame goes back to the inside of the gas burner due to an error.

20 Claims, 7 Drawing Sheets

6,063,329

MINI WELDING/SOLDERING TORCH

BACKGROUND OF THE INVENTION

The present invention relates to a welding/soldering torch, and more particularly to a mini welding/soldering torch which is safe in use.

The technique of gas welding has been intensively used for welding, cutting, or soldering metal objects. A regular welding/soldering torch is comprised of a hollow handle defining a mixing chamber, a fuel gas pipe and an oxygen pipe respectively connected to a fuel gas cylinder and an oxygen cylinder to guide fuel gas and oxygen to the mixing chamber in the handle, and a nozzle tip fastened to one end of the handle for output of fuel mixture for burning. Regular welding/soldering torches are commonly heavy, and not suitable for home (do-it-yourself) use. Further, regular welding/soldering torches do not have safety means to stop a backward flame, or to automatically cut off the supply of fuel gas upon a backward flame. Conventional welding/soldering torches are seen in U.S. Pat. No. 4,804,324 from Prince Industrial Development Co., Ltd., and U.S. Pat. Nos. 5,816,794 (Taiwan Utility Model No. 122521); 5,735,353 (Taiwan Utility Model No. 134495); 5,725,369 (Taiwan Utility Model No. 139455). These welding/soldering torches commonly use outside air for mixing with fuel gas into fuel mixture for burning. Because no high pressure oxygen is provided to mix with fuel gas into fuel mixture, the burning temperature of fuel mixture is not sufficient to melt metal into a molten status.

SUMMARY OF THE INVENTION

The present invention has been accomplished under the circumstances in view. It is one object of the present invention to provide a welding/soldering torch which is compact, and convenient for operation with one single hand. It is another object of the present invention to provide a welding/soldering torch which is safe in use, and suitable for home use. According to one aspect of the present invention, the mini welding/soldering torch comprises an oxygen control unit connected to an oxygen storage means to guide oxygen to a gas burner, the oxygen control unit comprising a control rod turned to regulate the flow rate of oxygen, a fuel gas storage means, a fuel gas control unit connected to the fuel gas storage means to guide fuel gas from the fuel gas storage means to a gas burner, the fuel gas control unit comprising a control rod turned to regulate the flow rate of fuel gas, a gas burner connected to the oxygen control unit and the fuel gas control unit through an oxygen delivery tube and a fuel gas delivery tube to receive oxygen and fuel gas, enabling fuel gas to be mixed with high pressure oxygen for burning. According to another aspect of the present invention, the gas burner comprises a valve holder fastened to the fuel gas delivery tube by a connecting element, a valve block fastened to the valve holder and sealed with an O-ring, the valve block having a fuel jet at one end thereof, a spring mounted inside the valve block, a stopper supported on the spring inside the valve block and forced by the spring to close the passage between the valve holder and the fuel gas delivery tube, a valve cap covered on the valve block over the fuel jet, the valve cap having an axial hole for output of fuel gas, a non-inflammable porous element mounted inside the valve cap and connected to the fuel jet at the valve block for guiding fuel gas from the valve block to the axial hole at the valve cap, a flow guide fastened to the valve cap to guide out fuel gas, the flow guide comprising an annular groove around the periphery thereof and a fuel gas outlet at the annular groove and a front tip, a rubber ring mounted on the flow guide around the annular groove at the flow guide to buffer output fuel gas for enabling fuel gas to be mixed with oxygen supplied from the oxygen delivery tube, a stepped cylindrical casing fastened to the valve block to hold the valve cap and the flow guide on the inside, the stepped cylindrical casing comprising a radially extended inlet connected to the oxygen delivery tube to guide in oxygen toward the front tip of the flow guide inside the stepped cylindrical casing for mixing with fuel gas, which flows out of the fuel gas outlet at the flow guide, and a jet nozzle assembly fastened to one end of the stepped cylindrical casing remote from the valve block for output of fuel gas-oxygen fuel mixture for burning, wherein if flame is burned backwards and goes into the inside of the jet nozzle assembly, the rubber ring will be melted to block the fuel gas outlet at the flow guide and to stop the supply of fuel gas; the stopper is forced backwards to stop the passage between the valve holder and the fuel gas delivery tube when the inside pressure of the valve block is increased over a predetermined level due to an increase of temperature in the valve block.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
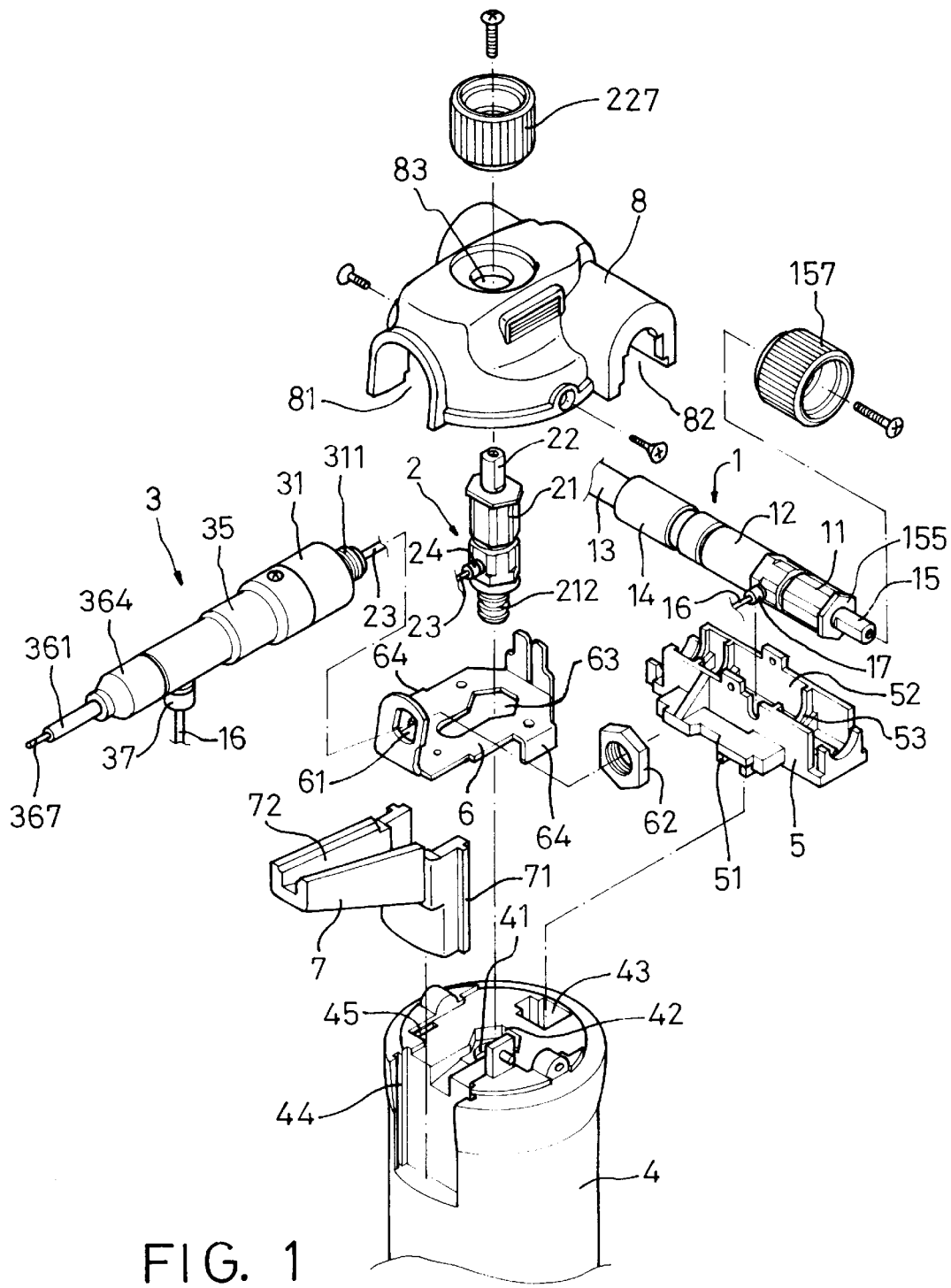
FIG. 1 is an exploded view of a mini welding/soldering torch according to the present invention.

Referring to FIG. 1, a mini welding/soldering torch in accordance with the present invention is generally comprised of an oxygen control unit 1, a fuel gas control unit 2, a gas burner 3, a disposable fuel cylinder 4, a carrier 5, a bracket 6, a support 7, and a cover shell 8.

Referring to FIGS. from 2 through 5 and FIG. 1 again, the oxygen control unit 1 is controlled to guide a flow of oxygen to the gas burner unit 3 for burning, comprised of a cylindrical valve block 11, a connecting tube 12, an oxygen supply tube 13, a chuck 14, and a control rod 15. The cylindrical valve block 11 comprises a stepped axial hole 111 axially extended through front and rear ends thereof and defining a neck 115, an outer thread 112 at its front end, an inner thread 114 at its rear end inside the stepped axial hole 111, and a radially extended guide hole 116 through its peripheral wall in communication with the stepped axial hole 111. The connecting tube 12 comprises an inner thread 122 at its rear end, an outer thread 126 at its front end, and a tubular coupling portion 127 forwardly extended from its front end. The outer thread 112 of the valve block 11 is threaded into the inner thread 122 at the rear end of the connecting tube 12, and sealed with an O-ring 113. A stopper 124 is mounted in the connecting tube 12, and fastened with a seal ring 125. A spring 123 is mounted in the connecting tube 12, and stopped between the stopper 124 and the front end of the valve block 11. The spring 123 imparts a forward pressure to the stopper 124, causing the stopper 124 to engage into a step 128 in the tubular coupling portion 127 and to close the passage through the tubular coupling portion 127. The oxygen supply tube 13 has one end connected to the tubular coupling portion 127, and an opposite end connected to an oxygen cylinder (not shown). The chuck 14 comprises an axial hole 141, which receives the oxygen supply tube 13, and an inner thread 142 threaded onto the outer thread 126 at the connecting tube 12 to fix the oxygen supply tube 13 to the connecting tube 12. The control rod 15 comprises an outer thread 152 on the middle threaded into the inner thread 114 at the rear end of the cylindrical valve block 11, a front stop tip 153 mounted with sealing rings 151 and moved axially with the control rod 15 to open/close the passage between the neck 115 and the radially extended guide hole 116 upon a rotary motion of the control rod 15, and a rear end 154 extended out of a screw cap 155, which has an outer thread 156 threaded into the inner thread 114 at the cylindrical valve block 11. A rotary knob 157 is fixedly fastened to the rear end 154 of the control rod 15 outside the screw cap 155. Through the rotary knob 157, the control rod 15 can conveniently be turned forwards/backwards with the hand to close/open the passage between the neck 115 and the radially extended guide hole 116. An oxygen delivery tube 16 is provided having one end connected to the radially extended guide hole 116 through a connector 17, and an opposite end connected to the gas burner 3. The connector 17 is comprised of a fitting 171 fastened to the radially extended guide hole 116, and a shell 172 fastened to the fitting 171 to secure the oxygen delivery tube 16 to the fitting 171. When the passage between the neck 115 and the radially extended guide hole 116 is opened, oxygen flows from the oxygen supply tube 13 into the connecting tube 12 to push the stopper 124 backwards against the spring 124, therefore the passage of through the tubular coupling portion 127 is opened for letting oxygen to flow into the cylindrical valve block 11, and then to flow out of the cylindrical valve block 11 through the radially extended guide hole 116 to the gas burner 3 via the oxygen delivery tube 16. In case the pressure of fuel mixture at the gas burner 3 surpasses the pressure of oxygen, the stopper 124 is forced forwards by the pressure of fuel mixture to close the passage through the tubular coupling portion 127, and therefore the supply of oxygen is stopped.

Figure 2:
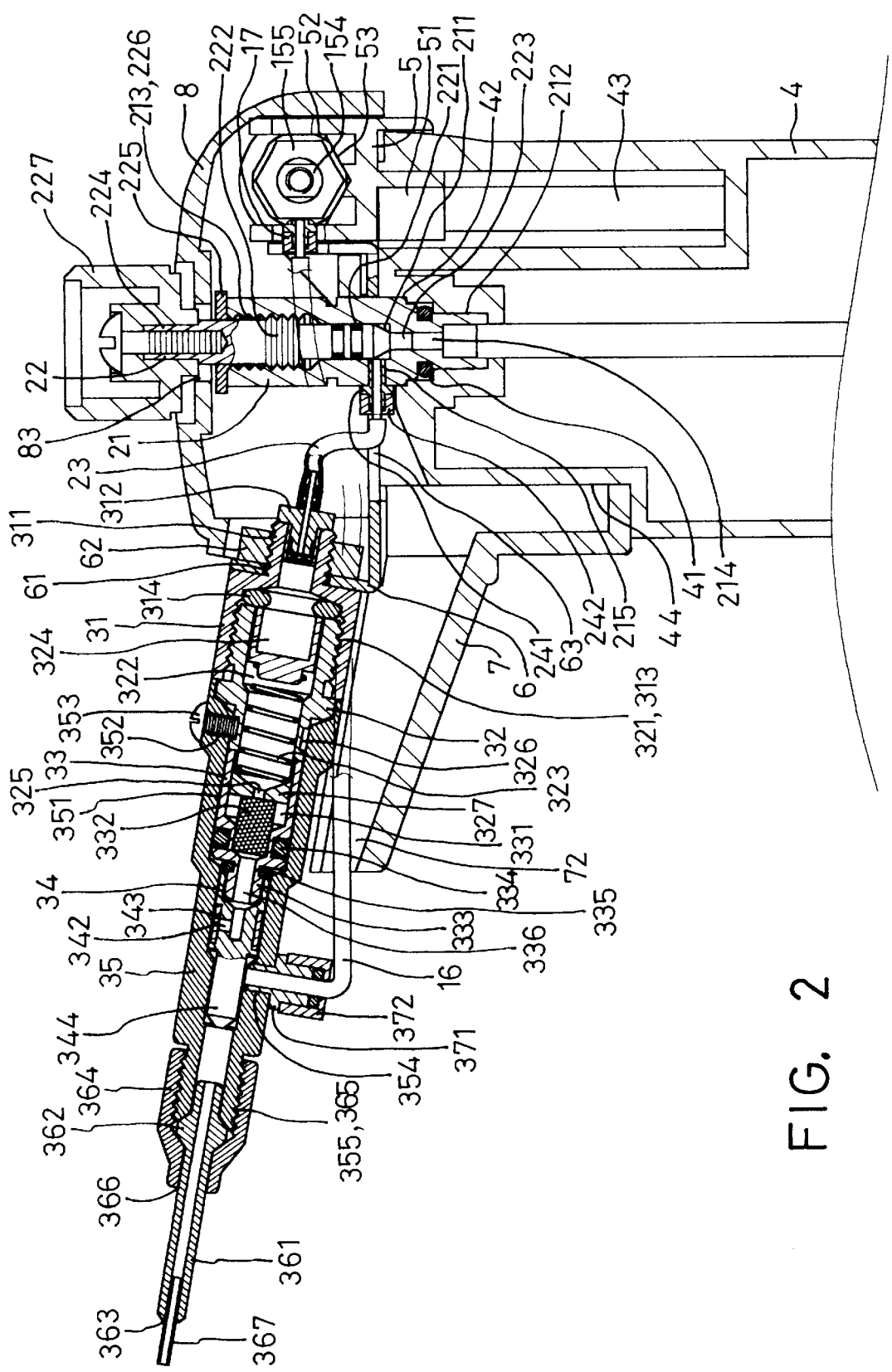
FIG. 2 is a front view in section in an enlarged scale of the mini welding/soldering torch shown in FIG. 1 when assembled.
Figure 3:
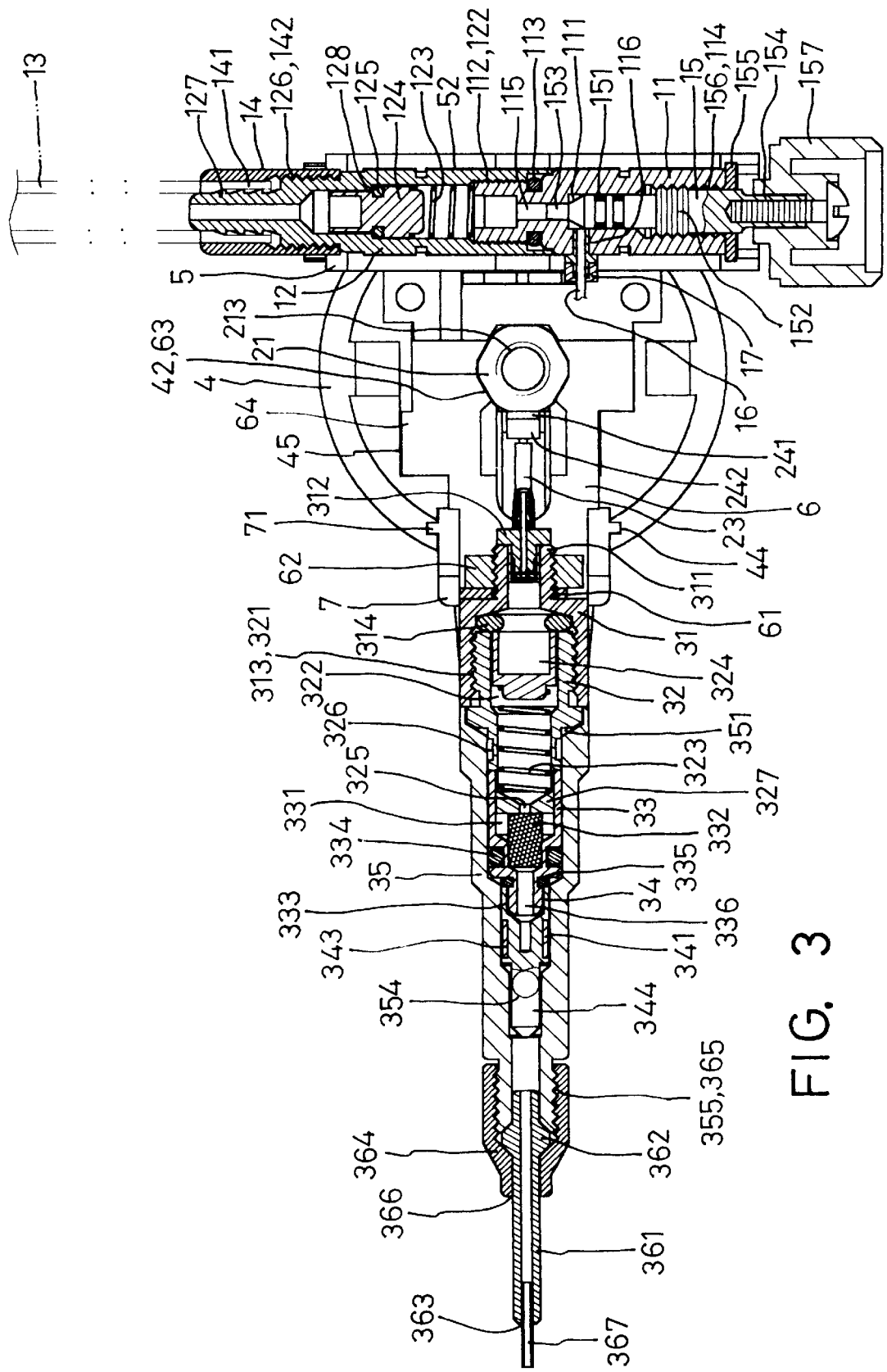
FIG. 3 is a top view of FIG. 2.
Figure 4:
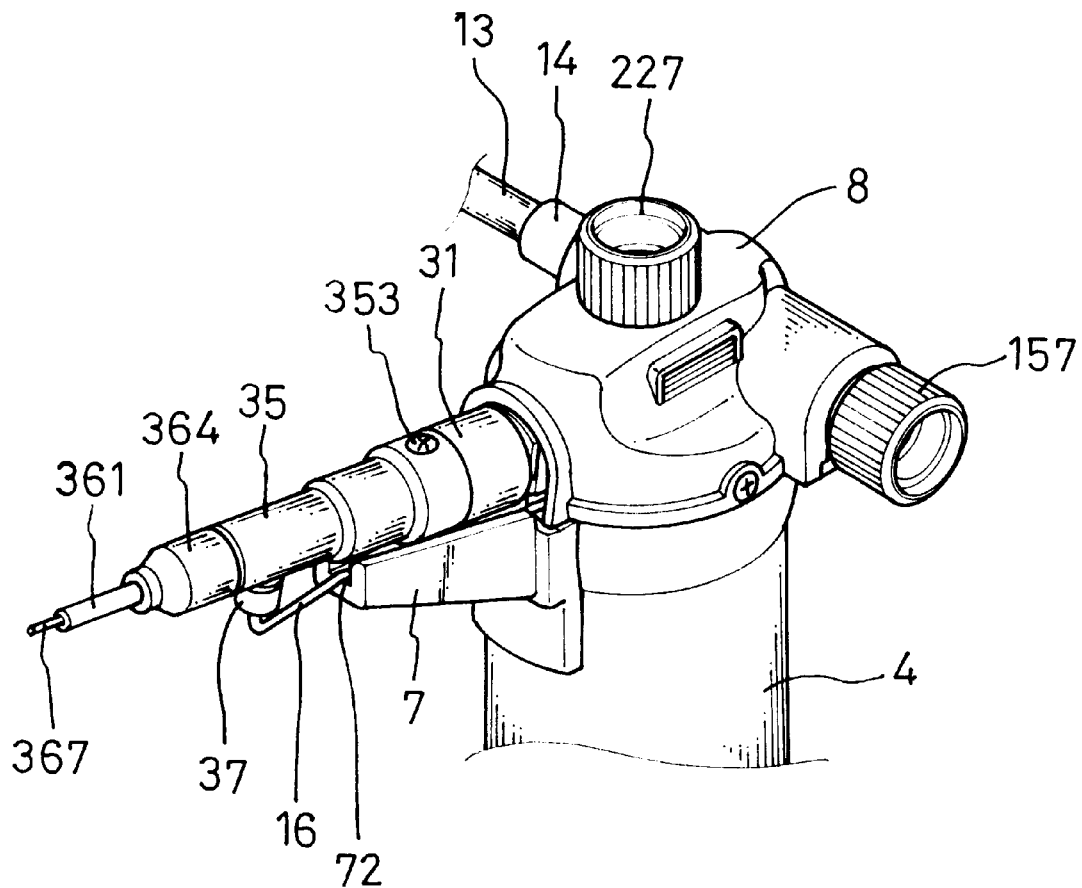
FIG. 4 is a perspective assembly view of FIG. 1.
Figure 5:
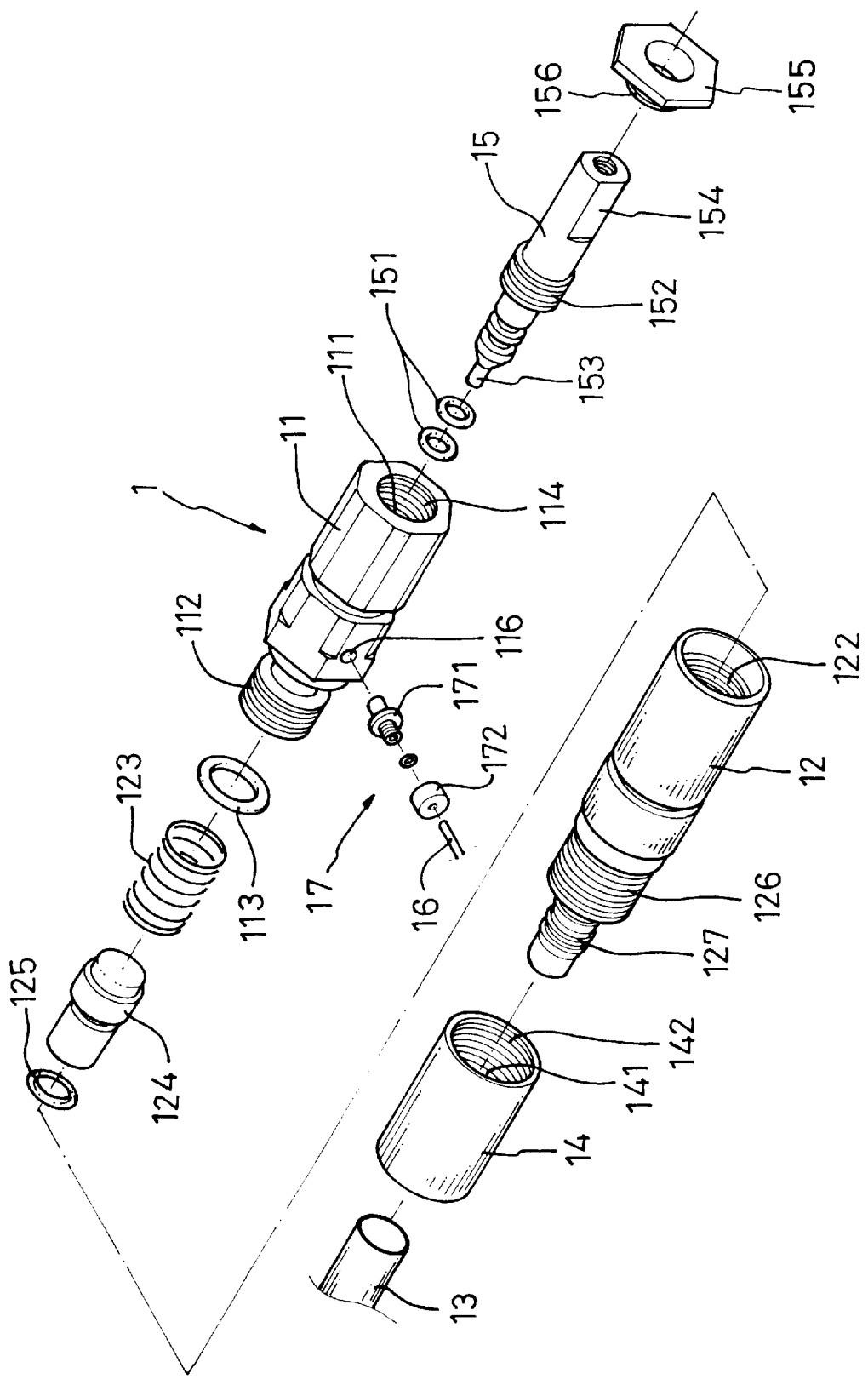
FIG. 5 is an exploded view of the oxygen control unit according to the present invention.
Figure 6:
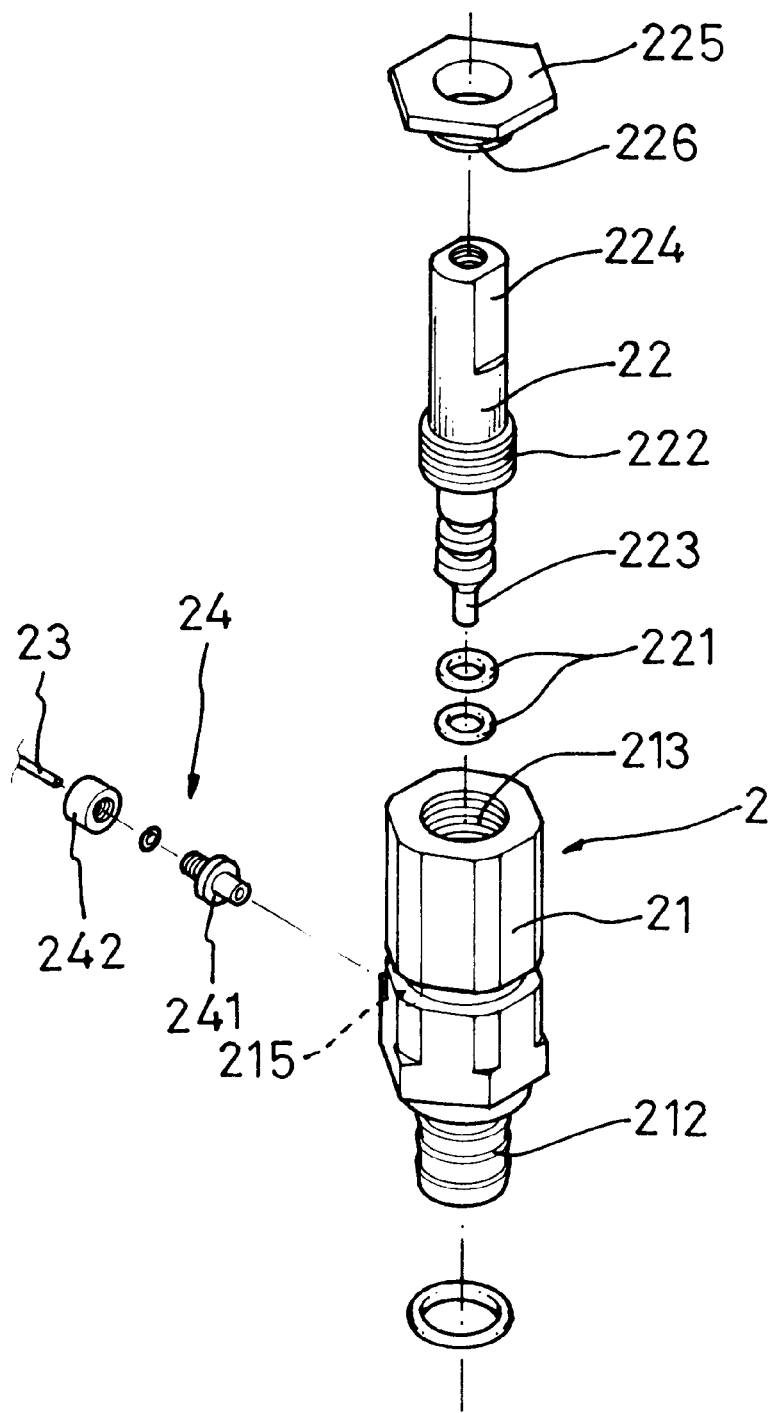
FIG. 6 is an exploded view of the fuel gas control unit according to the present invention.

Referring to FIG. 6 and FIGS. 1 and 2 again, the fuel mixture control unit 2 is controlled to guide a flow of fuel gas from the disposable fuel cylinder 4 to the gas burner 3 for burning, comprised of a cylindrical valve block 21, a control rod 22, a screw cap 225, a fuel gas delivery tube 23, and a connector 24. The cylindrical valve block 21 comprises a stepped axial hole 211 axially extended through front and rear ends thereof and defining a neck 214, a tubular front coupling portion 212 at its front end, which is connected to the disposable fuel cylinder 4, an inner thread 213 at its rear end inside the stepped axial hole 211, and a radially extended guide hole 215 through its peripheral wall in communication with the stepped axial hole 211. The control rod 22 comprises an outer thread 222 on the middle threaded into the inner thread 213 at the rear end of the cylindrical valve block 21, a front stop tip 223 mounted with sealing rings 221 and moved axially with the control rod 22 to open/close the passage between the neck 214 and the radially extended guide hole 215 upon a rotary motion of the control rod 22, and a rear end 224 extended out of a screw cap 225, which has an outer thread 226 threaded into the inner thread 213 at the cylindrical valve block 21. A rotary knob 227 is fixedly fastened to the rear end 224 of the control rod 22 outside the screw cap 225. Through the rotary knob 227, the control rod 22 can conveniently be turned forwards/backwards with the hand to close/open the passage between the neck 214 and the radially extended guide hole 215. The fuel gas delivery tube 23 is provided having one end connected to the radially extended guide hole 215 through the connector 24, and an opposite end connected to the gas burner 3. The connector 24 is comprised of a fitting 241 fastened to the radially extended guide hole 215, and a shell 242 fastened to the fitting 241 to secure the fuel gas delivery tube 23 to the fitting 241.

Figure 7:
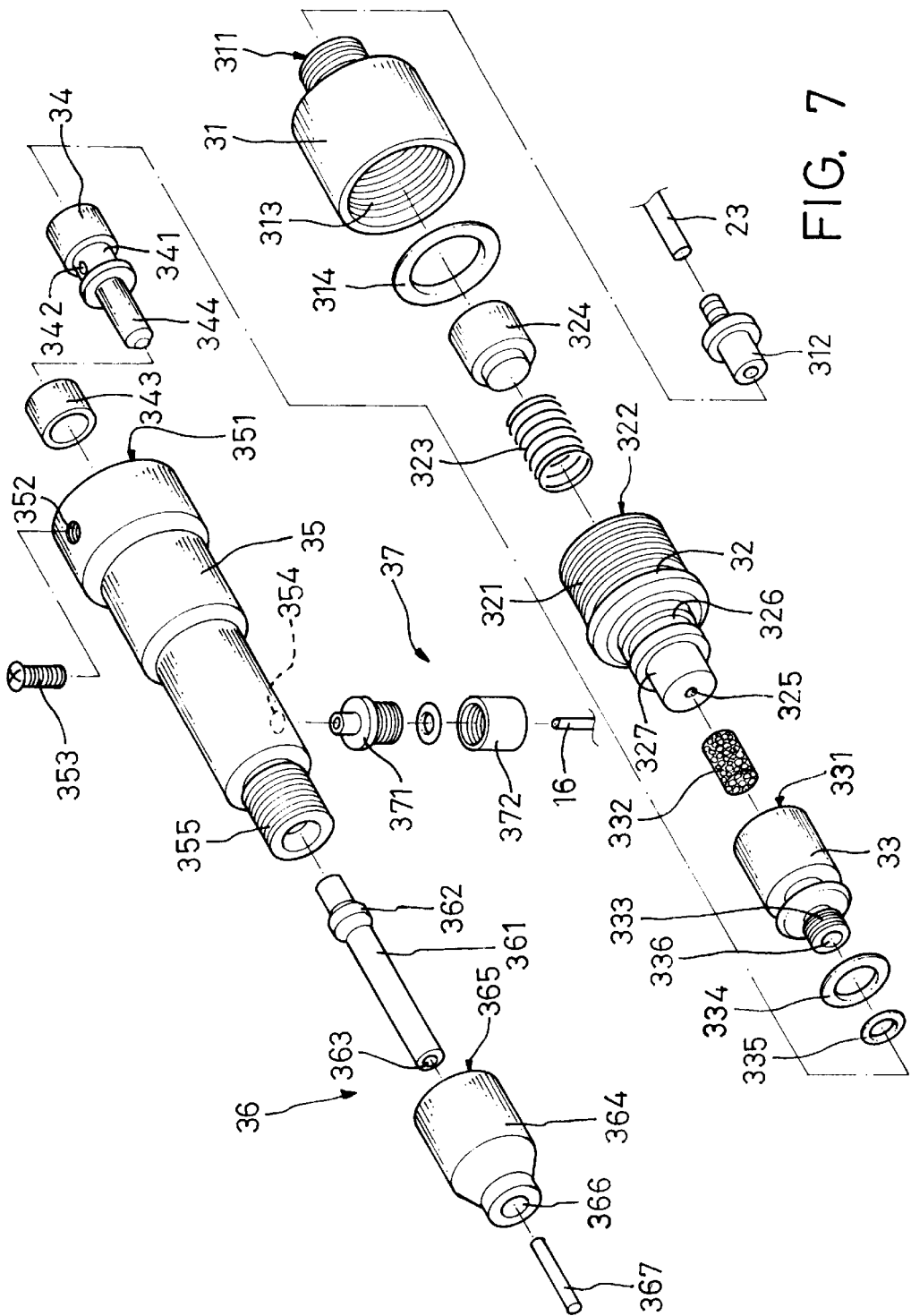
FIG. 7 is an exploded view of the gas burner according to the present invention.

Referring to FIG. 7 and FIGS. from 1 through 3 again, the gas burner 3 is comprised of a valve holder 31, a spring 323, a stopper 324, a valve block 32, a valve cap 33, a porous element 332, a flow guide 34, a rubber ring 343, a stepped cylindrical casing 35, a jet nozzle assembly 36, and a connector 37. The valve holder 31 comprises a threaded coupling neck 311 at one end connected to the fuel gas delivery tube 23 by a connecting element 312, and an inner thread 313 at an opposite end. The valve block 32 comprises an outer thread 321 at its one end, which is threaded into the inner thread 313 and sealed with an O-ring 314, a valve chamber 322, which receives the spring 323 and the stopper 324, an annular locating groove 326 around the periphery thereof on the middle, a front coupling portion 327 coupled to the valve cap 33, and an axially extended jet 325 axially extended through the front coupling portion 327. The stopper 324 is forced by the spring 323 to close the passage through the threaded coupling neck 311. When fuel gas comes from the fuel gas delivery tube 23 into the threaded coupling neck 311 of the valve holder 31, the stopper 324 is forced backwards against the spring 323, enabling fuel gas to flow through the valve block 32. The valve cap 33 comprises a rear chamber 331 fastened to the front coupling portion 327 of the valve block 32, a front coupling portion 333 mounted with seal rings 334 and 335 and coupled to the flow guide 34, and an axial hole 336 through the front coupling portion 333 in communication with the rear chamber 331. The porous element 332 is a non-inflammable element mounted in the rear chamber 331, which stops flame from extending backwards. The flow guide 34 is fastened to the front coupling portion 333 of the valve cap 33, comprising an annular groove 341 around the periphery thereof, a fuel gas outlet 342 at the annular groove 341, and a front tip 344. The rubber ring 343 is mounted on the flow guide 34 around the annular groove 341. When fuel gas comes out of the fuel gas outlet 342, it is stopped by the inside wall of the rubber ring 343, and forced to flow sideways along the inside wall of the rubber ring 343. The stepped cylindrical casing 35 comprises a stepped chamber 351 axially extended through front and rear ends thereof, which receives the flow guide 34, the valve cap 33 and the valve block 32, a radially extended screw hole 352 into which a locating screw 353 is threaded and engaged into the annular locating groove 326 at the valve block 32 to secure the stepped cylindrical casing 35 to the valve block 32, a threaded front neck 355, and a radially extended inlet 354 near the threaded front neck 355. The connector 37 connects the oxygen supply tube 16 to the radially extended inlet 354 at the stepped cylindrical casing 35. The connector 37 is comprised of a fitting 371 fastened to the radially extended inlet 354, and a shell 372 fastened to the fitting 371 to fix the oxygen supply tube 16 to the fitting 371. When oxygen is guided into the inlet 354 at the stepped cylindrical casing 35, it bumps against the front tip 344 of the flow guide 34, and is therefore forced to flow in all directions and to well mix with fuel gas coming out of the fuel gas outlet 342. The jet nozzle assembly 36 is comprised of a nozzle tube 361, a cap 364, and a nozzle tip 367. The nozzle tube 361 is fastened to the threaded front neck 355 of the stepped cylindrical casing 35, having a stop flange 362 raised around the periphery and stopped outside the threaded front neck 355 of the stepped cylindrical casing 35, and a nozzle hole 363 through which fuel mixture is forced out of the nozzle tube 361. The cap 364 is fastened to the stepped cylindrical casing 35 to hold the nozzle tube 361 in place. The cap 364 comprises an inner thread 365 threaded onto the threaded front neck 355 of the stepped cylindrical casing 35, and a front neck 366 through which the front end of the nozzle tube 361 extends out of the cap 364. The nozzle tip 367 is fastened to the nozzle hole 363 of the nozzle tube 361.

Referring to FIG. 2 again, if flame is burned backwards and goes into the inside of the nozzle tube 361, the rubber ring 343 will be melted to block the fuel gas outlet 342, and to stop the supply of fuel gas. If flame keeps going backwards, it will be extinguished by the porous element 332. If the porous element 332 does not extinguish flame, the inside pressure in the valve chamber 322 will be increased due to heat, causing the stopper 324 to be forced backwards to squeeze the O-ring 314 and to seal the passage through the threaded coupling neck 311, to further stop the supply of fuel gas. Therefore, the mini welding/soldering torch is safe in use. Because the mini welding/soldering torch is compact, it can conveniently be operated with one single hand. Operating the mini welding/soldering torch requires no special training. Referring to FIGS. from 1 through 4 again, the disposable fuel cylinder 4 comprises a recessed seat 42 at its top side wall, which receives the valve block 21 of the fuel gas control unit 2, a fuel gas outlet 41 through the recessed seat 42 which receives the tubular front coupling portion 212 of the fuel gas control unit 2, a positioning hole 43 at its top side wall, which receives a part of the carrier 5, a vertical coupling groove 44 provided at its peripheral wall at one side and longitudinally extended from its top side wall, and two retaining holes 45 bilaterally disposed at its top side wall. The support 7 comprises a vertical coupling portion 71 fastened to the vertical coupling groove 44 at the disposable fuel cylinder 4, and a grooved support portion 72 obliquely forwardly extended from the vertical coupling portion 71 to hold the gas burner 3. The bracket 6 comprises a receiving hole 61 which receives the threaded coupling neck 311 of the valve holder 31 of the gas burner 3, enabling a nut 62 to be threaded onto the threaded coupling neck 311 to secure the valve holder 31 of the gas burner 3 to the bracket 6, an opening 63 through which the valve block 21 of the fuel gas control unit 2 passes, and two legs 64 extended from two opposite lateral sides thereof and respectively fastened to the retaining holes 45 at the disposable fuel cylinder 4. The carrier 5 is mounted on the disposable fuel cylinder 4 to hold the oxygen control unit 1. The carrier 5 comprises a positioning bottom flange 51 fastened to the positioning hole 43 at the disposable fuel cylinder 4, a longitudinally extended top coupling groove 52, which receives the oxygen control unit 1, and a plurality of top positioning flanges 53 transversely provided in the longitudinally extended top coupling groove 52 to hold the oxygen control unit 1 firmly in the longitudinally extended top coupling groove 52. The cover shell 8 is covered on the disposable fuel cylinder 4 over the fuel gas control unit 2, having a center hole 83, which receives the rear end 224 of the control rod 22, a first side hole 81, which receives the gas burner 3, and a second side hole 82, which receives the oxygen control unit 1.

As indicated above, the mini welding/soldering torch is safety in use. When the pressure of burning fuel mixture surpasses a predetermined level, the supply of oxygen is automatically stopped. Because the mini welding/soldering torch is compact and can conveniently operated with one single hand, it is suitable for use in a precision processing work, for example, in processing precious metal. The supply of oxygen to fuel gas greatly increase the temperature of flame for a welding/soldering operation.

While only one embodiment of the present invention has been shown and described, it will be understood that various modifications and changes could be made thereunto without departing from the spirit and scope of the invention disclosed.

What the invention claimed is:

1. A mini welding/soldering torch comprising:

an oxygen control unit connected to an oxygen storage means to guide oxygen to a gas burner, said oxygen control unit comprising a control rod turned to regulate the flow rate of oxygen, and an oxygen delivery tube for output of oxygen;

a fuel gas storage means;

a fuel gas control unit connected to said fuel gas storage means to guide fuel gas from said fuel gas storage means to a gas burner, said fuel gas control unit comprising a control rod turned to regulate the flow rate of fuel gas, and a fuel gas delivery tube for output of fuel gas;

a gas burner connected to said oxygen delivery tube and said fuel gas delivery tube to receive oxygen and fuel gas from said oxygen control unit and said fuel gas control unit for burning, said gas burner comprising a valve holder fastened to said fuel gas delivery tube by a connecting element, a valve block fastened to said valve holder and sealed with an O-ring, said valve block having a fuel jet at one end thereof, a spring mounted inside said valve block, a stopper supported on said spring inside said valve block and forced by said spring to close the passage between said valve holder and said fuel gas delivery tube, a valve cap covered on said valve block over said fuel jet, said valve cap having an axial hole for output of fuel gas, a non-inflammable porous element mounted inside said valve cap and connected to the fuel jet at said valve block for guiding fuel gas from said valve block to the axial hole at said valve cap, a flow guide fastened to said valve cap to guide out fuel gas, said flow guide comprising an annular groove around the periphery thereof and a fuel gas outlet at said annular groove and a front tip, a rubber ring mounted on said flow guide around the annular groove at said flow guide to buffer output fuel gas for enabling fuel gas to be mixed with oxygen supplied from said oxygen delivery tube, a stepped cylindrical casing fastened to said valve block to hold said valve cap and said flow guide on the inside, said stepped cylindrical casing comprising a radially extended inlet connected to said oxygen delivery tube to guide in oxygen toward the front tip of said flow guide inside said stepped cylindrical casing for mixing with fuel gas, which flows out of the fuel gas outlet at said flow guide, and a jet nozzle assembly fastened to one end of said stepped cylindrical casing remote from said valve block for output of fuel gas-oxygen fuel mixture for burning;

wherein if flame is burned backwards and goes into the inside of said jet nozzle assembly, said rubber ring will be melted to block the fuel gas outlet at said flow guide and to stop the supply of fuel gas; said stopper is forced backwards to stop the passage between said valve holder and said fuel gas delivery tube when the inside pressure of said valve block is increased over a predetermined level due to an increase of temperature in said valve block.

2. The mini welding/soldering torch of claim 1 wherein said fuel gas is an oxygen-acetylene mixture.

3. The mini welding/soldering torch of claim 1 wherein said non-inflammable porous element is a porous stone.

4. The mini welding/soldering torch of claim 1 wherein said jet nozzle assembly comprises a nozzle tube fastened to one end of said stepped cylindrical casing, and a cap fastened to said stepped cylindrical casing to hold said nozzle tube in place, for enabling fuel mixture to be forced out of stepped cylindrical casing through said nozzle tube for burning.

5. The mini welding/soldering torch of claim 4 wherein said nozzle tube comprises a stop flange raised around the periphery thereof and stopped outside said stepped cylindrical casing.

6. The mini welding/soldering torch of claim 4 wherein said jet nozzle assembly further comprises a nozzle tip fastened to one end of said nozzle tube remote from said stepped cylindrical casing outside said cap.

7. The mini welding/soldering torch of claim 1 wherein said oxygen control unit comprises:

a cylindrical valve block having a front end, a rear end, and a radially extended guide hole on the middle connected to said oxygen delivery tube for output of oxygen;

a connecting tube having a front end connected to the oxygen storage means through an oxygen supply tube for input of oxygen, and a rear end connected to the front end of said cylindrical valve block;

a control rod threaded into the rear end of the valve block of said oxygen control unit and rotated to regulate the flow rate of oxygen passing from said oxygen supply tube through the guide hole at said valve block;

a screw cap fastened to the rear end of the valve block of said oxygen control unit to hold the control rod of said oxygen control unit in place; and a knob fixedly fastened to one end of the control rod of said oxygen control unit for turning by hand.

8. The mini welding/soldering torch of claim 7 wherein said oxygen control unit further comprises a spring mounted inside said connecting tube, and a stopper fastened with a seal ring and mounted inside said connecting tube and forced by the spring of said oxygen control unit to close the passage between said oxygen supply tube and said connecting tube.

9. The mini welding/soldering torch of claim 7 wherein said oxygen control unit further comprises a chuck fastened to one end of said connecting tube to secure said oxygen supply tube to said connecting tube.

10. The mini welding/soldering torch of claim 7 wherein said oxygen control unit further comprises a connector, which connects said oxygen delivery tube to the radially extended guide hole at the cylindrical valve block of said oxygen control unit.

11. The mini welding/soldering torch of claim 10 wherein said connector is comprised of a fitting fastened to the radially extended guide hole at the cylindrical valve block of said oxygen control unit, and a shell fastened to said fitting to secure said oxygen delivery tube to said fitting.

12. The mini welding/soldering torch of claim 1 wherein said fuel gas control unit comprises:

a cylindrical valve block, said cylindrical valve block comprising a tubular front coupling portion at a front end thereof connected to the fuel gas storage means, an inner thread at a rear end thereof, and a radially extended guide hole connected to said fuel gas delivery tube, a control rod threaded into the inner thread at the cylindrical valve block of said fuel gas control unit and turned to regulate the flow rate of fuel gas passing from said fuel gas storage means to said fuel gas delivery tube;

a screw cap fastened to the rear end of the cylindrical valve block of said fuel gas control unit to hold the control rod of said fuel gas control unit in place; and a knob fixedly fastened to one end of the control rod of said fuel gas control unit for turning by hand.

13. The mini welding/soldering torch of claim 12 wherein said fuel gas control unit further comprises a connector, which connects said fuel gas delivery tube to the radially extended guide hole at the cylindrical valve block of said fuel gas control unit.

14. The mini welding/soldering torch of claim 13 wherein said connector is comprised of a fitting fastened to the radially extended guide hole at the cylindrical valve block of said fuel gas control unit, and a shell fastened to said fitting to secure said fuel gas delivery tube to said fitting.

15. The mini welding/soldering torch of claim 12 further said fuel gas storage means comprising a top side wall, a recessed seat provided at said top side wall which receives the valve block of said fuel gas control unit, and a fuel gas outlet provided at said top side wall through said recessed seat which receives the tubular front coupling portion of the valve block of said fuel gas control unit.

16. The mini welding/soldering torch of claim 1 further comprising a carrier fastened to said fuel gas storage means to support said oxygen control unit, said carrier comprising at least one positioning bottom flange respectively fastened to a respective positioning hole at said fuel gas storage means, a longitudinally extended coupling groove, which receives said oxygen control unit, and transverse positioning flanges provided in the longitudinally extended coupling groove in said carrier to secure said oxygen control unit in place.

17. The mini welding/soldering torch of claim 1 further comprising a support fastened to said fuel gas storage means to support said gas burner, said support comprising a vertical coupling portion fastened to a vertical coupling groove at said fuel gas storage means, and a grooved support portion obliquely forwardly extended from said vertical coupling portion to hold said gas burner.

18. The mini welding/soldering torch of claim 1 further comprising a bracket fastened to said fuel gas storage means to support said gas burner, said bracket comprising a receiving hole which receives one end of said gas burner, enabling said gas burner to be secured to said bracket by a lock nut, an opening through which said fuel gas control unit passes, and a plurality of legs respectively fastened to respective retaining holes at fuel gas storage means.

19. The mini welding/soldering torch of claim 1 further comprising a cover shell covered on said fuel gas storage means over said fuel gas control unit, said cover shell comprising a center hole, which receives said the control rod of said fuel gas control unit, a first side hole, which receives said gas burner, and a second side hole, which receives said oxygen control unit.

20. The mini welding/soldering torch of claim 1 wherein the valve block of said gas burner comprises an annular groove around the periphery thereof on the middle, and the stepped cylindrical casing of said gas burner comprises a radially extended screw hole, and a locating screw threaded into said radially extended screw hole and engaged into the annular groove at the valve block of said gas burner to secure said stepped cylindrical casing to the valve block of said gas burner.

* * * * *